(12) United States Patent
Corless (10) Patent No.: US 6,885,999 B1
(45) Date of Patent: Apr. 26, 2005

(54) DIGITAL IDENTIFIERS AND DIGITAL IDENTIFIER CONTROL SYSTEMS FOR INTELLECTUAL PROPERTIES

(75) Inventor: Peter P. Corless, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/568,651

(22) Filed: May 10, 2000

(51) Int. Cl.[7] .......................... G06F 17/60; G06F 17/30
(52) U.S. Cl. ............................... 705/59; 705/54; 707/9; 707/104
(58) Field of Search .................... 705/50–59; 707/9–10, 707/100–104, 200, 205; 715/513; 380/201–203; 713/150–157, 164–169

(56) References Cited

U.S. PATENT DOCUMENTS

| | | | | |
|---|---|---|---|---|
| 5,765,152 A | * | 6/1998 | Erickson ........................ | 707/9 |
| 5,892,900 A | | 4/1999 | Ginter et al. ................. | 395/186 |
| 5,905,860 A | * | 5/1999 | Olsen et al. ............ | 395/187.01 |
| 5,910,987 A | | 6/1999 | Ginter et al. .................. | 380/24 |
| 5,915,019 A | | 6/1999 | Ginter et al. .................. | 380/4 |
| 5,917,912 A | | 6/1999 | Ginter et al. .................. | 380/24 |
| 5,920,861 A | | 7/1999 | Hall et al. ..................... | 707/9 |
| 5,943,422 A | | 8/1999 | Van Wie et al. ............... | 380/9 |
| 5,949,876 A | | 9/1999 | Ginter et al. .................. | 380/4 |
| 5,982,891 A | | 11/1999 | Ginter et al. .................. | 380/4 |
| 5,991,876 A | * | 11/1999 | Johnson et al. ............. | 713/200 |
| 6,006,332 A | * | 12/1999 | Rabne et al. ................ | 713/201 |
| 6,044,466 A | * | 3/2000 | Anand et al. ................ | 713/200 |
| 6,061,726 A | * | 5/2000 | Cook et al. .................. | 709/226 |

FOREIGN PATENT DOCUMENTS

EP 0 927 921 A2 * 7/1999 ............. G06F/1/00

OTHER PUBLICATIONS

Lunin, IBM Announces Electronic Copyright Solutions, Information Today v12n5 pp:1.3+, May 1995, ISSn 8755-6286.*

* cited by examiner

Primary Examiner—James P. Trammell
Assistant Examiner—Mary Cheung (57) ABSTRACT

A method and system thereof for controlling intellectual properties in an intellectual property management system. A unique digital identifier is assigned to each of the intellectual properties. The digital identifier includes an attribute associating a respective intellectual property to the intellectual property management system and an attribute specifying a source for the digital identifier. One class of digital identifier is assigned to all known instantiations of the respective intellectual property. A second class of digital identifies assigns a unique digital identifier to each specific instantiation of a respective intellectual property. The digital identifiers are stored in a registry. The digital identifier may also be embedded within the intellectual property, or it may be inscribed within a document or element which accompanies, proceeds, follows, or is otherwise related to the intellectual property. Characteristics and meta-data are also assigned to the intellectual property for searching, tracking, classifying and understanding the intellectual property.

12 Claims, 8 Drawing Sheets

DIGITAL IDENTIFIERS AND DIGITAL IDENTIFIER CONTROL SYSTEMS FOR INTELLECTUAL PROPERTIES

TECHNICAL FIELD

The present invention relates to the electronic transfer of information, particularly intellectual property, over computer system networks. More specifically, the present invention pertains to the identification and control of intellectual properties over the Internet.

BACKGROUND ART

Intellectual property can be considered in terms of either its "embodiments" or its "representations." Generally, an embodiment of an intellectual property is the property itself, while a representation of the intellectual property can be data or meta-data either describing or pointing to the property.

For example, intellectual properties such as real-time human communications, stored and forwarded messages, documents or collections, dynamic or persistent data structures and databases, interpretable scripts, source code, and partially or fully compiled programs and applications, as well as other intellectual properties generally referred to as "content," are often described as an embodiment of the intellectual property. Embodiments of intellectual property can also be theoretical or abstract concepts which are exemplified, documented or reified as a specific form of content.

Legal rights, contracts, agreements or other assertions can be embodied in the form of content, but are not the embodiment of the intellectual property itself. Instead, these are considered representations of the intellectual property. Some intellectual properties, such as a deed or title to a home, can be representations of physical or real properties.

Intellectual properties are becoming more and more central to the world economy. In an information economy, discrete or aggregate values are placed on intellectual properties, and the markets for general or specific applications of these properties are huge. For example, the software industry, which has embodiments of intellectual properties in software products and services, and representations of property rights in licenses, legal contracts and agreements, copyrights, trademarks and patents, currently has annual sales rates of over $135 billion per year.

Increasingly, the Internet (or World Wide Web) is the medium of transmission of intellectual properties such as software products and the like. The Internet uses the Internet Protocol (IP) to frame, route, and reassemble digital messages. The transaction of intellectual property is a general transfer of data and data communications over the Internet; intellectual property such as software is simply treated as a bit stream in Internet Protocol. On top of the Internet Protocol are specialized transport layer services, such as HTTP (Hypertext Transfer Protocol) or SMTP (Simple Mail Transfer Protocol). Within these, many messages are encoded in markup languages such as XML (Extensible Markup Language), the World Wide Web Consortium (W3C) meta-markup language based on SGML (Standard Generalized Markup Language).

Uniform Resource Locations (URLs) are one of the central features of the World Wide Web (WWW). URLs commonly use "http://www" as their preamble, although other types of URLs exist, such as "mailto:". A URL identifies a unique WWW addressable location of an instantiation of a resource. Multiple URLs can resolve to the same resource, and there are also methods to resolve the same URL to multiple instantiations of the resource, through load balancing and redirection techniques. To date, although there is a general lack of standards and existing standards are overly broad in scope, URLs are generally well-used. There are some standards in the process of being developed; however, these standards are focused on methods for controlling content rather than for asserting legal control. Instead, URLs are primarily used only to locate the computer system and network data necessary to manipulate intellectual property from the computer's point of view. URLs today do not specifically identify intellectual property as intellectual property.

Uniform Resource Identifiers (URIs) provide a generalized method to create short schematic and semiotic representations that can be used to reference, identify or invoke computerized resources (intellectual properties) over the Internet. The URI schema is a valuable general purpose tool, but does not necessarily specify what kind of intellectual property is identified by the URI. In many cases, the specification of the kind of intellectual property is done solely as the kind of IP traffic the property will travel over, such as via HTTP, SMTP (mailto), FTP (File Transfer Protocol), NNTP (Network News Transfer Protocol), telnet, or gopher. Though this information is useful with regard to the technical infrastructure, little or no information is available to the user with regard to the intellectual value of the intellectual property.

Accordingly, what is needed is a method and/or system that can be used to create and manage uniform resource identifiers that can be applied to all instantiations of an intellectual property, for the purposes of asserting legal rights and controls for the intellectual property and for granting those rights to a purchaser or licensee. What is also needed is a method and/or system that satisfies the above need and can be used to assign uniform resource identifiers to the characteristics to the intellectual property, to provide information to a user regarding the intellectual value of the property.

These and other objects and advantages of the present invention will become obvious to those of ordinary skill in the art after having read the following detailed description of the preferred embodiments which are illustrated in the various drawing figures.

DISCLOSURE OF THE INVENTION

The present invention provides an infrastructure for uniquely naming an intellectual property, assigning this name to all known instantiations of the property, and for assigning characteristics to the intellectual property regarding the intellectual value of the intellectual property as well as other relevant information (e.g., meta-data).

The present embodiment of the present invention provides a method and system thereof for controlling intellectual properties in an intellectual property management system. A series of protocols and applications needed to accomplish this are described. In accordance with the present invention, the intellectual property management system treats the acts of communication and the communicated data itself as forms of intellectual property rights and intellectual properties, instead of treating the transaction of intellectual properties as a general transfer of data and data communications.

Specifically, in the present embodiment of the present invention, a unique digital identifier is assigned to each of the intellectual properties. The digital identifier includes an attribute associating a respective intellectual property to the intellectual property management system and an attribute specifying a source for the digital identifier. One class of digital Identifier is assigned to all known instantiations of the respective intellectual property. A second class of digital identifies assigns a unique digital identifier to each specific instantiation of a respective intellectual property. The digital identifiers are stored in a registry. Characteristics and metadata can also be assigned to the intellectual property.

In one embodiment, the digital identifier can be parsed and transformed into or out of XML (Extensible Markup Language) elements. Another embodiment can be represented as a textual string of data. By parsing through and interpreting the digital identifier, characteristics of the intellectual property can be determined and understood, and the resource identified by the digital identifier can be manipulated. Another embodiment would relate the digital identifier to a visual, computer-interpretable symbol or series of symbols, such as a bar code, OCR (optical character reader) text block, or other glyphic.

In one embodiment, a digital identifier is used to link the intellectual property to a digital feature element that can be used to describe features of the intellectual property. In another embodiment, a digital identifier is used to link the intellectual property to a digital rights element that can be used to describe the legal rights and limitations associated with the intellectual property. In yet another embodiment, a digital identifier is used to link the intellectual property to a digital license element that can be used to provide a license for the intellectual property.

The present invention thus provides a method and system for uniquely naming an intellectual property, and for using this name for all known instantiations of the intellectual property (e.g., for asset management and tracking). Intellectual and other characteristics can also be assigned to the property to facilitate searching, tracking, classifying, understanding, manipulation and use of the intellectual property.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "assigning," "storing," "specifying," "enabling," "identifying," "parsing," "determining" or the like, refer to actions and processes (e.g., process 800 of FIG. 7) of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems.

Figure 1A:
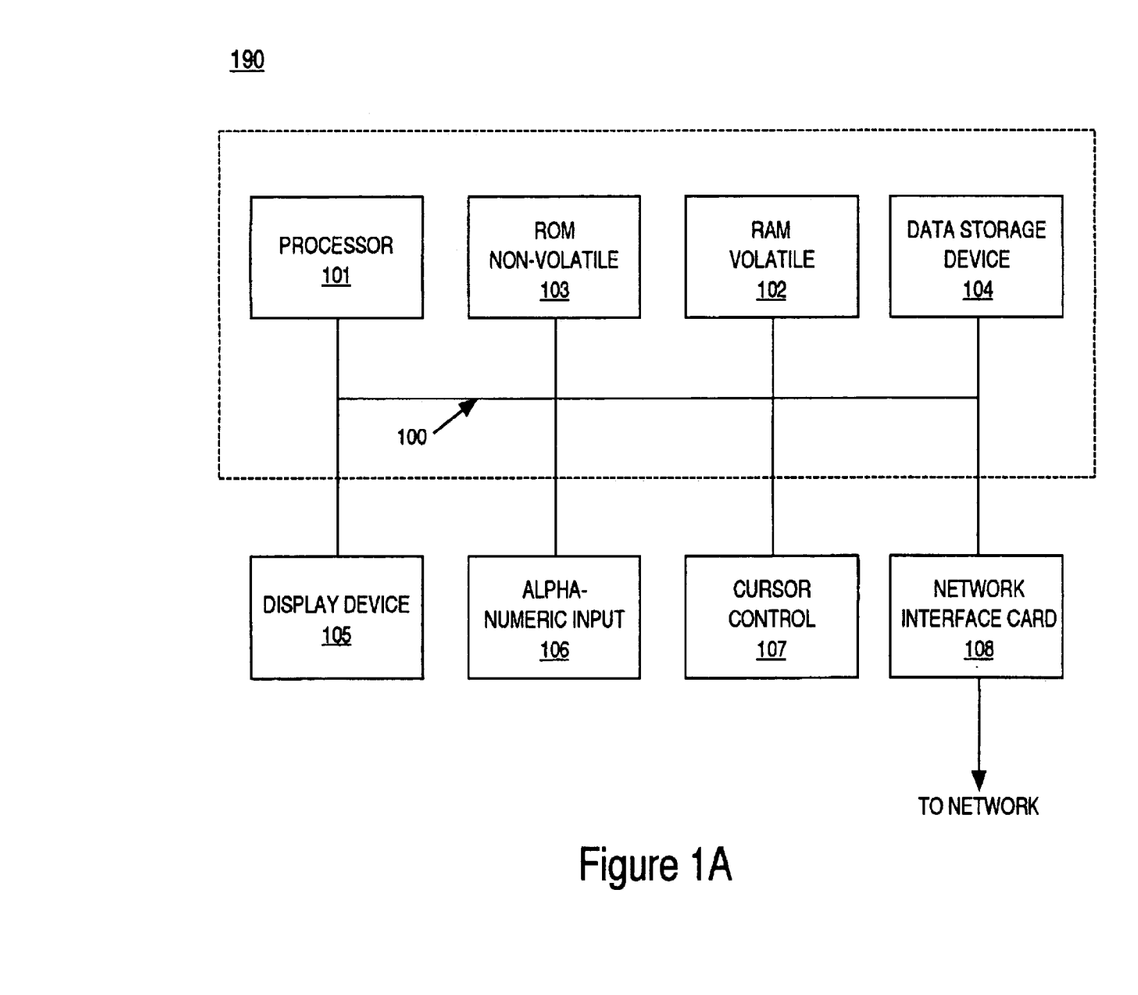
FIG. 1A is a block diagram of an exemplary computer system upon which embodiments of the present invention may be practiced.

Refer now to FIG. 1A which illustrates an exemplary computer system 190 upon which embodiments of the present invention may be practiced. In general, computer system 190 comprises bus 100 for communicating information, processor 101 coupled with bus 100 for processing information and instructions, random access (volatile) memory 102 coupled with bus 100 for storing information and instructions for processor 101, read-only (non-volatile) memory 103 coupled with bus 100 for storing static information and instructions for processor 101, data storage device 104 such as a magnetic or optical disk and disk drive coupled with bus 100 for storing information and instructions, an optional user output device such as display device 105 coupled to bus 100 for displaying information to the computer user, an optional user input device such as alphanumeric input device 106 including alphanumeric and function keys coupled to bus 100 for communicating information and command selections to processor 101, and an optional user input device such as cursor control device 107 coupled to bus 100 for communicating user input information and command selections to processor 101. Furthermore, a network interface card (NIC) 108 is used to couple computer system 190 onto, for example, a client-server computer system network. In such a network, computer system 190 can exemplify a client computer system and/or a server computer system.

Display device 105 utilized with computer system 190 may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

Figure 1B:
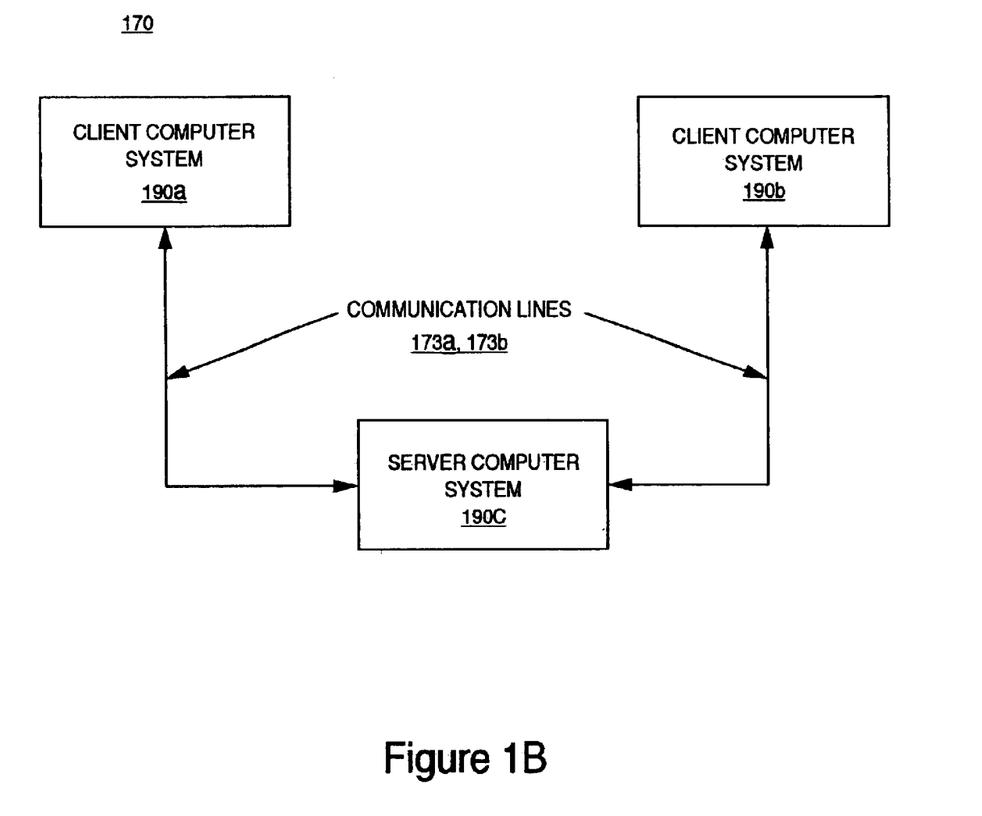
FIG. 1B is a block diagram illustrating an exemplary client-server computer system network upon which embodiments of the present invention may be practiced.

FIG. 1B is a block diagram illustrating an exemplary client-server computer system network 170 ("network 170") upon which embodiments of the present invention may be practiced. Network 170 may be a communication network located within a firewall of an organization or corporation (an "Intranet"), or network 170 may represent a portion of the World Wide Web or Internet. Client (or user) computer systems 190a and 190b and server computer system 190c are communicatively coupled via communication lines 173a and 173b; the mechanisms for coupling computer systems over the Internet or over Intranets are well-known in the art. This coupling can be accomplished over any network protocol that supports a network connection, such as Internet Protocol, TCP (Transmission Control Protocol), NetBIOS, IPX (Internet Packet Exchange), and LU6.2, and link layers protocols such as Ethernet, token ring, and ATM (Asynchronous Transfer Mode). Alternatively, client computer systems 190a and 190b can be coupled to server computer system 190c via an input/output port (e.g., a serial port) of server computer system 190c; that is, client computer systems 190a and 190b and server computer system 190c may be non-networked devices. It is appreciated that, for simplicity, only two client computer systems and a single server computer system are shown; however, it is understood that network 170 may comprise any number of client computer systems and server computer systems.

Figure 2:
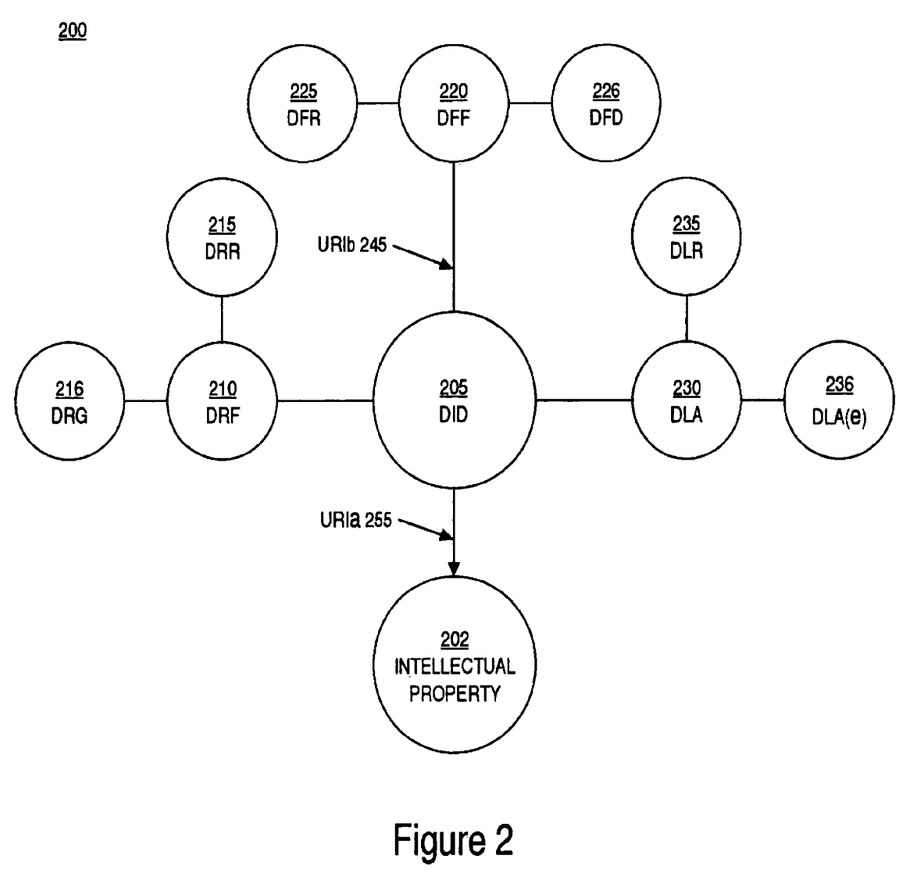
FIG. 2 shows the framework of an intellectual property management system in accordance with one embodiment of the present invention.

FIG. 2 shows the framework of an intellectual property management system 200 in accordance with one embodiment of the present invention. Intellectual property management system 200 can be implemented over the Internet (e.g., World Wide Web), over an Intranet, or using non-networked devices that are communicatively linked. Intellectual property management system 200 provides a system and method thereof for controlling the identification, negotiation, establishment, and transaction of intellectual properties (embodiments and representations) over the Internet. Additional information is provided in the copending patent application filed concurrently herewith, assigned to the assignee of the present invention, entitled "Intellectual Property Over Internet Protocol Framework," by Peter Corless, with Ser. No. 09/568,647 hereby incorporated by reference. The reference application provides the framework, referred to as the "IP over IP" framework, for facilitating the legal and commercial aspects of intellectual property transactions.

Intellectual property 202 can be either a representation or an embodiment of an intellectual property. In accordance with the present embodiment of the present invention, intellectual property 202 is assigned a unique digital identifier (DID) 205, which serves as a Uniform Resource Identifier (e.g., URIa 255) that points to intellectual property 202. When used as a unique digital identifier for intellectual property 202, URIa 255 is referred to as a "Uniform Resource Name" (URN).

In the present embodiment, a DID generally consists of the following:

1) a Uniform Resource Identifier (URI) string that is substantially compliant with IETF (Internet Engineering Task Force) RFC (Request for Comment) 2396;

2) the application of specific schema and semiotics to the URI string to identify the URI as belonging to the IP over IP framework. This will generally allow the URI to be tested for proper form, thereby allowing further processing by an "IP over IP engine" (see FIG. 4);

3) the application of schema and semiotics to specify the origin or source of the DID, so that any intellectual property referenced by the DID can be tracked to an identified source or registry location for further information, validation, changes, etc.; and 4) the application of schema and semiotics to identify where the intellectual property falls within the system or organization that is the origin or source of the DID. This includes generalized indications such as DID templates or schematics, variables, or specific value and data assignments.

Thus, in the present embodiment, DIDs can be contained within a URI string. DIDs can also be encoded with a URI using cryptographic or translative techniques. In one embodiment, the digital identifier is embedded within the intellectual property, or it may be inscribed within a document or element which accompanies, proceeds, follows, or is otherwise related to the intellectual property.

In accordance with the present invention, the DID can be associated with other forms of information management systems such as the Universal Product Code ("bar code"). For instance, when a bar code is scanned, that bar code may be associated with the DID for an intellectual property, so that the bar code itself prompts the return of Information from the IP over IP framework. Another embodiment would relate the digital identifier to a visual, computer-interpretable symbol or series of symbols, such as an OCR (optical character reader) text block, or other glyphic. Another embodiment can be represented as a textual string of data. By parsing through and interpreting the digital identifier, characteristics of the intellectual property can be determined and understood, and the resource identified by the digital identifier can be manipulated.

In the present embodiment, an electronic link, hyperlink or some other type of reference or pointer is enabled between DID 205 and other intellectual property elements (e.g., digital rights framework 210, digital feature format 220, and digital licensing agreement 230) in order to establish the terms and conditions for accessing, using and distributing intellectual property 202. In one embodiment, different URIs (exemplified by URIb 245) may be used to point to these other intellectual property elements. When used as a pointer to other intellectual property elements, URIb 245 is referred to as a "Uniform Resource Characteristic" (URC).

In the present embodiment, intellectual property management system 200 allows a localized instantiation of an intellectual property resource, identified perhaps by its Uniform Resource Location (URL), to be registered against its URN. Intellectual property management system 200 further allows all registered or known localized instantiations of the intellectual property resource, identified by its URN, to be looked up and found according to their known locations (e.g., by their URLs). In addition, intellectual property management system 200 allows known characteristics of the intellectual property (the intellectual property identified by its URN) or known instantiations of the intellectual property (the instantiations identified by their URLs) to be registered or related through URCs. Furthermore, intellectual property management system 200 allows characteristics of intellectual property resources to be specified and looked up. Accordingly, intellectual property management system 200 can find which named intellectual property (e.g., URN) or which localized instantiation of the intellectual property (e.g., a URL) satisfies (or does not satisfy) the specified characteristics or other requirements specified by the requesting user or system.

Thus, in the present embodiment, the instantiations of an intellectual property resource can be assigned a URN, and URCs can be assigned to either the URN or to the instances of the intellectual property resource at their URLs.

Continuing with reference to FIG. 2, in one embodiment, digital rights framework (DRF) 210 is an intellectual property element for describing the rights granted by the intellectual property owner with regard to intellectual property 202. Digital rights request (DRR) 215 describes a request made to the owner for access to intellectual property 202 and for other rights associated with the property. Digital rights grant (DRG) 216 describes the rights granted by the owner of intellectual property 202. Additional information regarding the digital rights framework is provided in the copending patent application filed concurrently herewith, assigned to the assignee of the present invention, entitled "Digital Rights Framework," by Arthur James et al., with Ser. No. 09/569,095 hereby incorporated by reference.

In one embodiment, digital feature format (DFF) 220 is an intellectual property element for describing the features of intellectual property 202. Digital feature request (DFR) 225 describes a query made with regard to these features. DFR 225 can also describe a request to add or remove a feature of intellectual property 202. Digital feature description (DFD) 226 describes the actual product features in response to the query, or modified features in response to a request for a change in features.

In one embodiment, digital license agreement (DLA) 230 is an intellectual property element describing a licensing agreement for intellectual property 202. Digital license request (DLR) 235 describes a request made for a digital license, and DLA(e) 236 describes the actual digital license agreement made between the intellectual property owner and a licensee.

Provided below is an example of a digital license request (e.g., DLR 235) codified in XML in accordance with one embodiment of the present invention.

```
<LICENSEREQUESTS>
<DLR Type="StandardLicense">
   <Authorization Type="PSE" TimeIssued="DD-MMM-YYYY">
      <PSE>
         <SalesOrder SalesOrderNumber="NNNNNNN"
         SalesOrderDate="DD-MMM-YYYY"/>
         <PurchaseOrder PurchaseOrderNumber="AAAAA"
         PurchaseOrderDate="DD-MMM-YYYY"/>
         <DLA Type="EULA"/>
         (Order Type="Standard-NL"/)
      </PSE>
   </Authorization>
   <RequestingSystem>
      <HostName>[Host Name]</HostName>
      <ServerName>[Server Name]</ServerName>
      <Location>[Location]</Location>
   </RequestingSystem>
   <RequestingUser>
      <OrganizationName>ERP</OrganizationName>
      <UserName>[User Name]</UserName>
      <ContactEmailAddress>[Address]</ContactEmailAddress>
   </RequestingUser>
   <Product SubGroup="SCAN-PAK">
      <LineId>nnnnnnn</LineId>
      <LineNumber>1</LineNumber>
      <InventoryItemId>mmmmmmm</InventoryItemId>
      <ProductName>SW-WC1.0</ProductName>
      <ProductDescription>WebClient user license
      (initial minimum order></ProductDescription>
      <OrderedQuantity>1</OrderedQuantity>
      <Licensee>
         <SiteContact/>
         <OrganizationName>[Name}</OrganizationName>
         <Address>
            <StreetAddress>
               <Line>
            </StreetAddress>
            <City/>
            <State/>
            <Province/>
            <Zip/>
            <Country/>
         </Address>
      </Licensee>
      <Intermediary>
         <SiteContact>[Name]</SiteContact>
         <OrganizationName>[Name]</OrganizationName]
         <Address>
            <StreetAddress>
               <Line>
            </StreetAddress>
            <City/>
            <State/>
            <Province/>
            <Zip/>
            <Country/>
         </Address>
      </Intermediary>
      <LicenseRequested>
         <PakParams/>
         <NumberOfLicenses>500</NumberOfLicenses>
         <LicenseParams/>
         <HostOS/>
         <HostName>[Name]</HostName>
         <HostId>nmnmnmn</HostId>
         <Pak/>
      </LicenseRequested>
      <LicenseDispatch>
         <EmailAddress>[Address]</EmailAddress>
         <OutboundDir/>
      </LicenseDispatch>
   </Product>
</DLR>
</LICENSEREQUESTS>
```

Provided below is an example of a digital license agreement (e.g., DLA(e) 236) codified in XML in accordance with one embodiment of the present invention.

```
<DLA version="1.0">
  <License Type="[EULA|ILA]"
    Description="[End User License Agreement|Intermediary
    License Agreement]"
    DLANumber="[DLANumber]">
    <Authorization Type="PSE"
      Description="Product Sales Entitlement">
      <PSE>
        <SalesOrder SONumber=""SODate=""/>
        <PurchaseOrder PONumber=""PODate+""/>
        <Order Type="[Resale|Internal]"/>
      </PSE>
    </Authorization>
    <Agreement>
      <Licensor>
      </Licensor>
      <Intermediary>
      </Intermediary>
      <Licensee>
      </Licensee>
    </Agreement>
    <TermsAndConditions>
      <LicensePeriod Type="[Perpetual|Limited]">
        <StartDate>[YYYY-MM-DDTHH:MM-GGGG]</StartDate>
        <TerminalDate>[YYYY-MM-DDTHH:MM-GGGG]
        </TerminalDate>
      </LicensePeriod>
    </TermsAndConditions>
    <ProductList>
      <Product ProductLineNo=""ProductName=""ProductDesc=
      ""ProductQty=""ProductLicenseID="">
      </Product>
      <Product ProductLineNo=""ProductName=""ProductDesc=
      ""ProductQty=""ProductLicenseID="">
        <ProductOrderAttributes>
          <PakParams>      </PakParams>
          <LicenseBlocks>[CSV numerical values]</LicenseBlocks>
          <LicenseParams>  </LicenseParams>
          <HostOS>         </HostOS>
          <HostName>       </HostName>
          <HostID>         </HostID>
          <ChassisID>      </ChassisID>
          <Pak>            </Pak>
        </ProductOrderAttributes>
      </Product>
    </ProductList>
    <LicenseKeyList>
      <LicenseKey ProductLicenseID="">
      <LicenseKeyDescription>[License
      Key Description</LicenseKeyDescription>
      <LicenseKeyValue>[License Key Value]</LicenseKeyValue>
      <LicenseKeyHref="[URI]">[Description
      of URI]</LicenseKeyHref>
    </LicenseKeyList>
    <InstallationInstructions ProductLicenseID="">
      <TextInstructionBlock>
      </TextInstructionBlock>
    </InstallationInstructions>
  </License>
</DLA>
```

Regarding the example DLA codified above, the authorization key may be a public key, a digital certificate, or some other form of authentication. The "intermediary" block is used in cases of an Intermediary License Agreement or a channel-delivered EULA (End User License Agreement). In the "terms and conditions" block, legal terms of the agreement are included and can be an ASCII text block, HTML (HyperText Markup Language) or XML formatted text, or an external reference via URI (e.g., URC) to other local or remote documents. The terms and conditions are included for the elements listed in the "product list" block. The product list can be reiterated from the DLR. The products can include a list of character-data license key values or an external pointer to an associated file which contains license-related data. The "product license ID" attribute is a local file reference to the "license key" element.

In accordance with the present invention, a DID can be used to indicate different types of intellectual property resources including, but not limited to: an intellectual property itself; a representation of the intellectual property; an intellectual property name (e.g., URN); a location of an intellectual property instantiation (e.g., a URL); an intellectual property characteristic (e.g., a URC); a model of an intellectual property (for example, copyrighted properties all conform to a certain model); a class or type of intellectual property; a model of a type of intellectual property; a legal, actual or theoretical interest in an intellectual property; a legal entity or interest's name; a legal entity or interest's location; a legal entity or interest's characteristic(s); a model of a legal entity or interest a class or type of legal entity or interest; a model of a class or type of entity or interest; an intellectual property declaration, assertion or claim; an intellectual property declaration, assertion or claim's name; an intellectual property declaration, assertion or claim's location; an intellectual property declaration, assertion or claim's characteristics; a model for intellectual property declarations, assertions or claims; an intellectual property inquiry or request; an intellectual property inquiry or request's name; an intellectual property inquiry or request's location; an intellectual property inquiry or request's characteristic(s); a model for an intellectual property inquiry or request; and a class or type of an intellectual property inquiry or request.

As an example, a DID (e.g., DID 205 of FIG. 2) may be assigned in the following manner for a company "Company" that produces software products that are delivered using a Company Software Delivery System (CSD) such as that described by FIG. 6 below. A typical URL for one software product (that is, one intellectual property resource) may be:

ftp://ftp.company.com/product-identifier.bin

A DID for this intellectual property resource in the CSD may be:

csd:company.com/product-identifier.bin

In accordance with the present invention, any instantiation of this resource (e.g., in any computer system) would allow characteristics for this resource to be looked up.

In some instances, a prefix may be affixed in order to understand the intellectual property resource in a more universal DID naming scheme, as in the example below:

dff:type=service&vendor=company.com&id=csd

This example DID could be extended for more descriptive mechanisms:

dff:type=service&vendor=company.com&id= csd&name="Company Delivery System"&moreinfo= "http://www.company.com/".

Because many strings embedded into XML need to keep whitespace and quotations as specialized reserved characters, the above example would require that reserved characters be transformed into escaped characters in a known manner.

Using the digital feature format (FIG. 2) in conjunction with, for example, a hierarchical schema, a DID could specify what type of services are provided by CSD, such as in the example DID below:

dff:type=service&schema-type=hierarchical&schema= commerce:offering-type:service:networking:deliver-system&schema-owner=company.com Complexity can be added to this example DID using semiotics for more complex schema types, versions and so on.

A DID used as a URC for digital rights is exemplified as:

drf:copyright=company.com

The above example makes the assertion, in the digital rights framework (see FIG. 2), that "Company" has copyright of the intellectual property resource. This can be made more complex by chaining assertions through the use of XML, as exemplified below:

```
<property
    name="dff.csd:company.com/product-identifier.bin"
    right="drf:copyright=company.com"/>
```

The above example makes the assertion that "Company" has copyright over the named property found at the specified URN with CSD.

DIDs can also be transformed into various XML data elements and attributes through parsing and object manipulation, such as in the example below:

```
drf:copyright=company.com
<drf>
<copyright>company.com</copyright>
</drf>
```

The advantage of the XML markup is that its structure is more complex and it lends itself to parsing by a user. In addition, XML allows the use of known application program interfaces such as the Document Object Model (DOM).

As shown in the examples above, the present invention enables a user to determine more information about the intellectual property and its intellectual value than that provided by a URL. In accordance with the present invention, users can query against more familiar intellectual property concepts instead of solely using a URL. By simple string analysis, a user can identify a URI (e.g., a URN or URC) as a DID for an intellectual property that is managed within the IP over IP framework (FIG. 2). By parsing through and interpreting the URI string, an IP over IP engine (FIG. 4) can understand and process the URN, and can manipulate the associated intellectual property and its characteristics.

Figure 3:
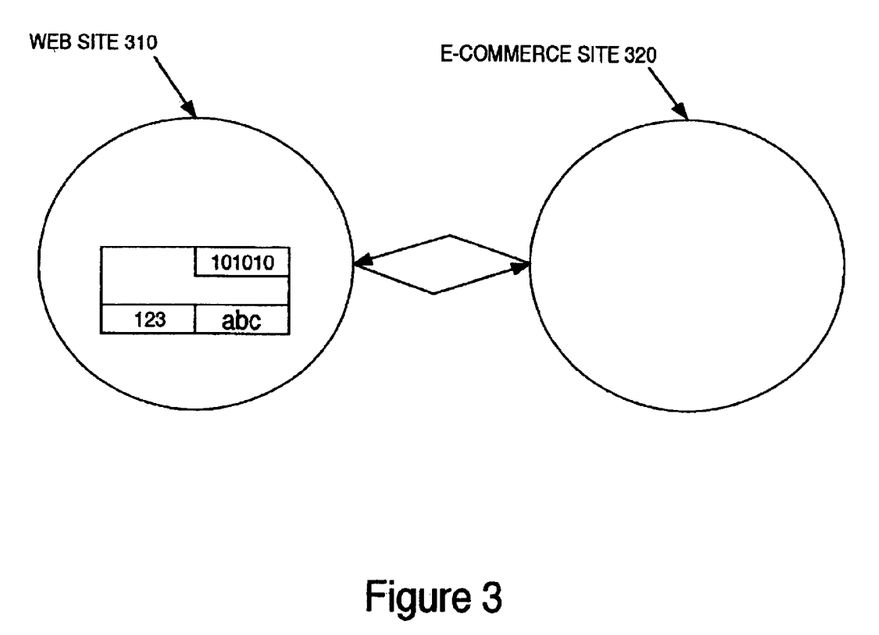
FIG. 3 is diagram exemplifying an interface between Internet sites in accordance with one embodiment of the present invention.

FIG. 3 is diagram exemplifying the interface between World Wide Web ("Web") site 310 and electronic commerce ("e-commerce") site 320 in accordance with one embodiment of the present invention. It is appreciated that, in a similar manner, this interface can occur over an Intranet or using non-networked devices that are communicatively linked.

In the present embodiment, Web site 310 includes content (e.g., intellectual property 202 of FIG. 2) that is available for sale, license, rent, etc. In one embodiment, Web site 310 and its content (including intellectual property 202) are codified using XML (Extensible Markup Language) and described by a URN (e.g., DID 205). In one embodiment, the features of intellectual property 202 are described by DFD 226 (FIG. 2), which is linked to intellectual property 202 (DID 205) by a URC (e.g., URI 245b).

Continuing with reference to FIG. 3, in the present embodiment, e-commerce site 320 is communicatively coupled to Web site 310 according to Internet Protocol. The content of e-commerce site 320 includes various intellectual properties for sale, rent, etc., each property perhaps described by text or accompanied by its picture. In one embodiment, e-commerce site 320 and its content are codified using XML.

In accordance with the present invention, with reference to FIGS. 2 and 3, the interface between Web site 310 and e-commerce site 320 is accomplished using intellectual property management system 200. As described above, in one embodiment, the content of Web site 310 is described by an intellectual property element such as DFF 220 (specifically, DFD 226). The owner of the content of Web site 310 grants rights and spells out limitations to the seller or licensee responsible for e-commerce site 320. In one embodiment, the rights and limitations associated with intellectual property 202 are described by an intellectual property element such as DRF 210 (specifically, DRG 216). In one embodiment, these rights and limitations are instead provided by a license described by an intellectual property element such as DLA 230 (specifically, DLA(e) 236). In accordance with the present embodiment of the present invention, DFF 220, DRF 210 and DLA 230 are linked to intellectual property 202 by URCs.

With reference to FIGS. 2 and 3, an example illustrating the application of intellectual property management system 200 is described. Using Web site 310, intellectual property 202 is published as being offered for sale, license, or the like. A representation of intellectual property 202 is identified using DID 205, so th at queries can be made with regard to the features and rights associated with the property. Using Internet Protocol, e-commerce site 320 initiates a request (e.g., DRR 215 or DLR 235) to Web site 310 regarding certain types of intellectual properties (perhaps software of for a particular application). Web site 310 responds with a list of relevant intellectual properties using their DIDs (e.g., URNs) or through an XML message containing digital feature format documents (e.g., DFD 226) for the properties.

Web site 310 also can provide the terms and conditions (e.g., DRG 216 or DLA(e) 236) with regard to the sale, rent, license, etc., of the intellectual properties (or for one particular intellectual property selected by e-commerce site 320). E-commerce site 320 can review these terms and conditions and, in one embodiment, can provide them to a human user for approval. Upon approval, the agreement is returned to Web site 310 and the commercial transfer of the intellectual property is accomplished over the Internet. The agreement can also be stored electronically for further processing or for reference.

Figure 4:
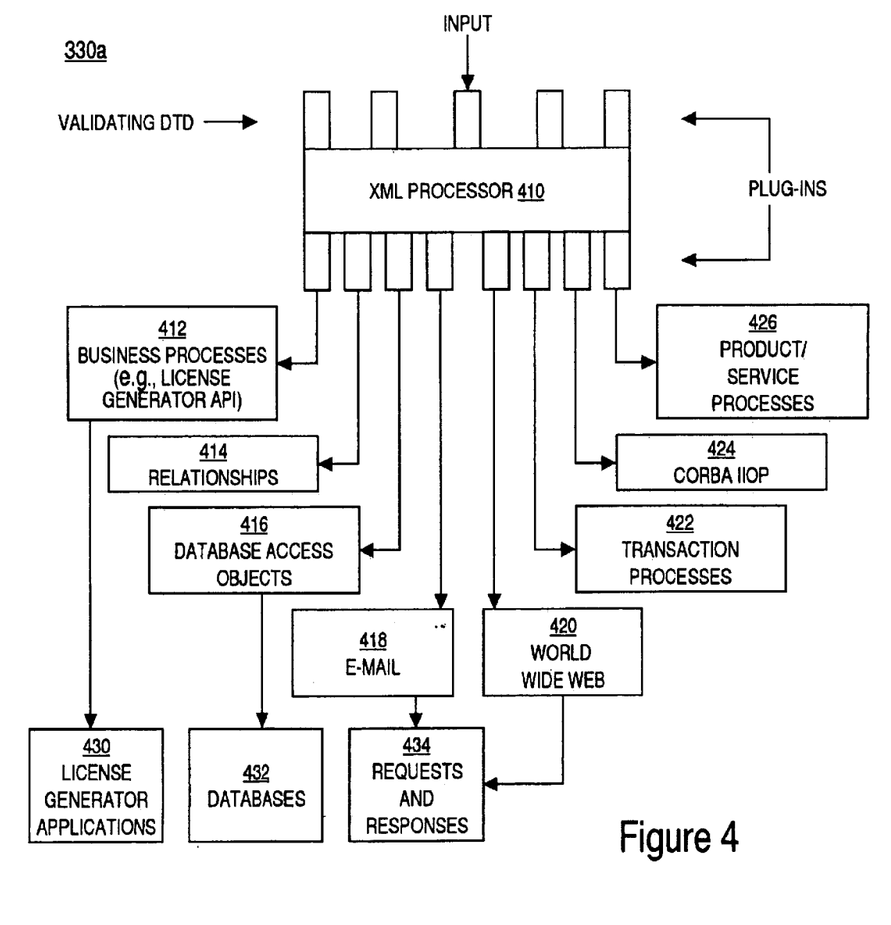
FIG. 4 is a block diagram illustrating one embodiment of a software-based engine for controlling the distribution of intellectual property in accordance with the present invention.

FIG. 4 is a block diagram illustrating one embodiment of a software-based engine (e.g., IP/IP engine 330a) for controlling the distribution of intellectual property in accordance with the present invention. In the present embodiment, IP/IP engine 330a is executed via computer-readable program instructions stored in a memory unit (e.g., random access memory 102, read-only memory 103, and/or data storage device 104) and executed by processor 101 of computer system 190 (FIG. 1A). In the present embodiment, IP/IP engine 330a is based on an XML processor 410 with plug-ins on its input side and on its output side. However, it is appreciated that, instead of XML, any markup language (such as SGML) could be used for message format and character markup. In addition, any application programming language can be used (such as VisualBasic, Java, C/C++ or PERL). In the present embodiment, CORBA (Common Object Request Broker Architecture) version 2.0 is used, although it is understood that the present invention is not limited to this version of CORBA. It is further appreciated that any of the various compatible computer operating systems, programming languages, or hardware platforms can also be used.

IP/IP engine 330 interfaces with the enterprise resource planner (ERP) to receive an order, for example. On the input side of XML processor 410 are validating document (or data) type descriptors (DTDs). DTDs are known in the art and are used to declare what kinds of tags can be present in a valid instance of the XML language and how the tags are related.

In the present embodiment, the output side of XML processor 410 implements a plurality of plug-ins including plug-ins for: business processes 412, relationships 414, database access objects 416, Internet transport types including e-mail 418, World Wide Web 420, transaction processes 422, CORBA IIOP 424, and product/services processes 426.

The business processes 412 plug-in includes the business logic for product evaluation, sales, registration, support, re-hosting and re-licensing. In one embodiment, business processes 412 includes the application program interface (API) for license generator applications 430 (refer also to FIGS. 6 and 7). With the appropriate business logic, IP/IP engine 330a can perform any number of the following functions: a "requester" function for forming and dispatching messages in the IP over IP framework; a "validator" function for parsing and validating IP over IP requests and responses (e.g., for form and completeness); an "approver" function for applying business logic to hold and/or forward IP over IP requests and responses to the appropriate grantor; a "grantor" function for applying business logic to create explicit permit/deny responses to IP over IP requests; and a "generator" function to generate or publish rights grants, licenses, or other IP over IP messages or payloads.

The relationships 414 plug-in addresses the relationships between users of the product, and can also provide the relationships between the owners of the intellectual property and their legal rights and limitations with regard to the product. The database access objects 416 plug-in is for accessing and/or writing to databases (e.g., databases 432) containing, for example, product authorization keys (PAKs), registered license keys (RLKs) and DLAs. The e-mail 418 plug-in provides input/output services including sending requests and responses 434 using electronic mail, and similarly World Wide Web (WWW) 420 plug-in is for providing WWW presentations. The transaction process 422 plug-in is for handling transactions. The product/services processes 426 plug-in provides the processes for specific and different, or generalized, or policy-based product service entitlements, product contract entitlements, product export entitlements, product registrations, product warranty entitlements, product evaluation entitlements. In the present embodiment, the CORBA IIOP 424 plug-in refers to the Common Object Request Broker Architecture IIOP protocol. However, it is appreciated that IP/IP engine 330a can employ a number of different Internet Protocol message transport mechanisms, including real time connections using CORBA IIOP protocol, batch processing using Unix remote copy ("rcp"), e-mail protocols (e.g., SMTP, POP, etc.), WWW HTTP, advanced services on top of HTTP (such as Marimba Castanet services), or any protocol designed for use on an Internet Protocol-based network.

Additional information regarding the IP/IP engine is provided in the copending patent application filed concurrently herewith, assigned to the assignee of the present invention, entitled "Intellectual Property Over Internet Protocol Engine," by Peter Corless, with Ser. No. 09/568,604 hereby incorporated by reference.

Figure 5:
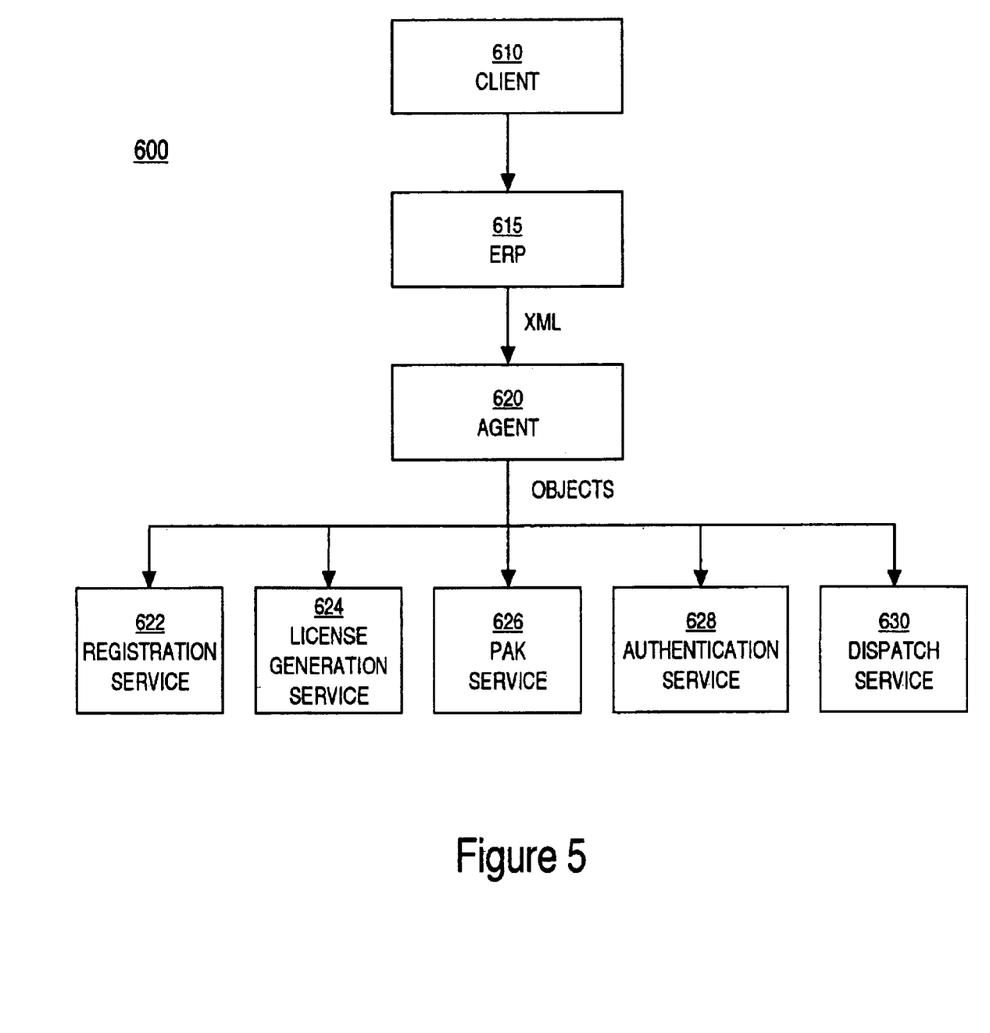
FIG. 5 is a block diagram showing a system for processing a request for an intellectual property in accordance with one embodiment of the present invention.

FIG. 5 is a block diagram showing a system 600 for processing a request for an intellectual property in accordance with one embodiment of the present invention. In the present embodiment, system 600 is executed via computer-readable program instructions stored in a memory unit (e.g., random access memory 102, read-only memory 103, and/or data storage device 104) and executed by processor 101 of computer system 190 (FIG. 1A).

Specifically, system 600 is managed using IP/IP engine 330a (FIGS. 4 and 5). With reference to FIG. 5, client 610 places an order or request (e.g., DLR 235 of FIG. 2) for intellectual property 202 (FIG. 2). In the present embodiment, system 600 is described in the context of product services entitlement processes, although it is appreciated that, as explained in conjunction with FIG. 4, other product/services processes 426 may be implemented in accordance with the present invention. Enterprise resource planner (ERP) 615 receives the request, formats it according to XML, and forwards it to agent 620.

Continuing with reference to FIG. 5, agent 620 provides an interface between ERP 615 and IP/IP engine 330a (FIG. 4). Agent 620 receives the request and parses it into objects that correspond to the various services that are needed to fulfill the request. Different services can be provided for different products. In the present embodiment, the services performed include registration service 622, license generation service 624, PAK service 626, authentication service 628, and dispatch service 630. In this embodiment, license generation service 624 is used for generating DLA(e) 236 (FIG. 2). In one embodiment, dispatch service 630 is used to e-mail DLA(e) 236 to client 610, although it is appreciated that transport mechanisms other than e-mail may also be used.

Figure 6:
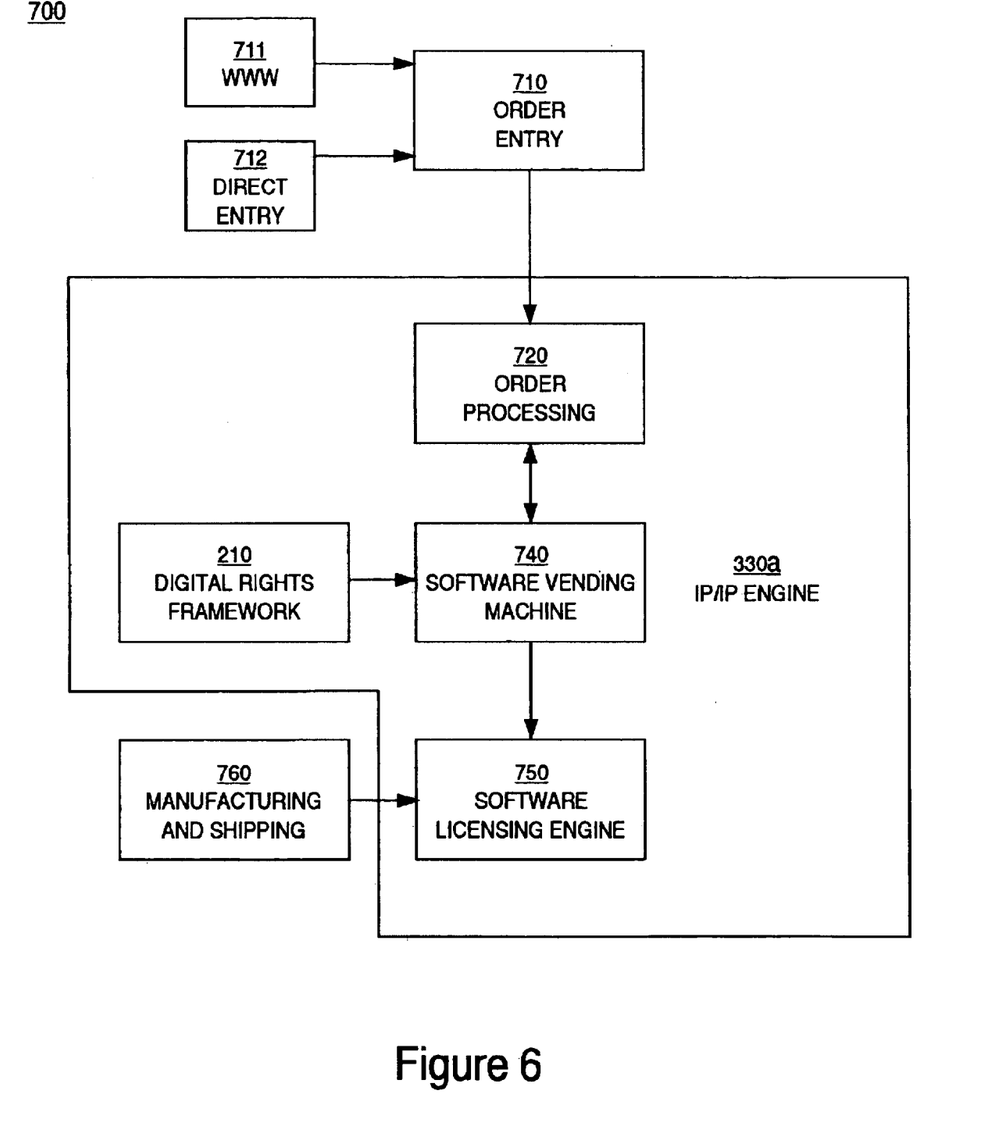
FIG. 6 is a block diagram of a system for intellectual property distribution in accordance with one embodiment of the present invention.

FIG. 6 is a block diagram of a system 700 for processing intellectual property distribution in accordance with one embodiment of the present invention. In the present embodiment, system 700 is executed via computer-readable program instructions stored in a memory unit (e.g., random access memory 102, read-only memory 103, and/or data storage device 104) and executed by processor 101 of computer system 190 (FIG. 1A). In accordance with the present invention, system 700 is managed using IP/IP engine 330a (FIG. 4). Specifically, order processing unit 720, digital rights framework 730, software vending machine 740 and software licensing engine 750 are managed by IP/IP engine 330a. In the present embodiment, IP/IP engine 330a interfaces with the enterprise resource planner (e.g., ERP 615 of FIG. 5) via order processing unit 720 and digital rights framework 210.

With reference to FIG. 6, order entry unit 710 receives an order or request from a client (e.g., client 610 of FIG. 5) for an intellectual property (e.g., intellectual property 202 of FIG. 2). In one embodiment, the order is placed via WWW 711 (including e-mail). In another embodiment, the order is placed via direct entry 712 by client 610 or by customer support, however, it is appreciated that other mechanisms for placing an order may be used in accordance with the present invention, such as by fax, phone, or physical mail delivery, and entered by human operators into a computerized fulfillment system.

Continuing with reference to FIG. 6, the order is converted to XML (see FIG. 5) and forwarded to order processing unit 720. In the present embodiment, batch processing of the XML message is used; however, in another embodiment, the XML message is processed in real time (e.g., live). With batch processing, order processing unit 720 performs a monitoring function to determine if a new order has been received. In one embodiment, order processing unit 720 identifies whether intellectual property 202 can be delivered electronically. Order processing unit 720 converts the XML message into objects, and forwards the request to software vending machine 740 for resolution.

Digital rights framework 210 accesses information such as the order history and warranty/contract history for intellectual property 202, as well as the rights and limitations associated with the intellectual property (see discussion in conjunction with FIG. 2). Digital rights framework 210 verifies and validates entitlements of client 610 and provides the entitlement information to software vending machine 740.

In the present embodiment, software vending machine 740 receives the request from order processing unit 720. Software vending machine 740 is used to generate a license (e.g., DLA(e) 236 of FIG. 2) via software licensing engine 750. Software vending machine 740 can also change entitlement information and either respond to an error- or escalate the error to a human user for resolution. Software vending machine 740 is also the mechanism for fulfilling the order via e-mail, the WWW, or the like.

Software licensing engine 750 functions with software vending machine 740 to validate requests and generate and store licenses. Licensing information (such as a contract number or a serial number) is stored by software licensing engine 750 in a database. Software licensing engine 750 can also be used to reissue a key (e.g., a PAK or a RLK) if, for example, the associated intellectual property has been moved from one computer system to another (hence changing its address and in turn invalidating the RLK), or if the key becomes corrupted or is accidentally deleted. In the present embodiment, software licensing engine 750 performs process and product lookups. In one embodiment, manufacturing and shipping information 760 is tied into software licensing engine 750 to provide a mechanism for tracking products still in inventory and products that have shipped.

Figure 7:
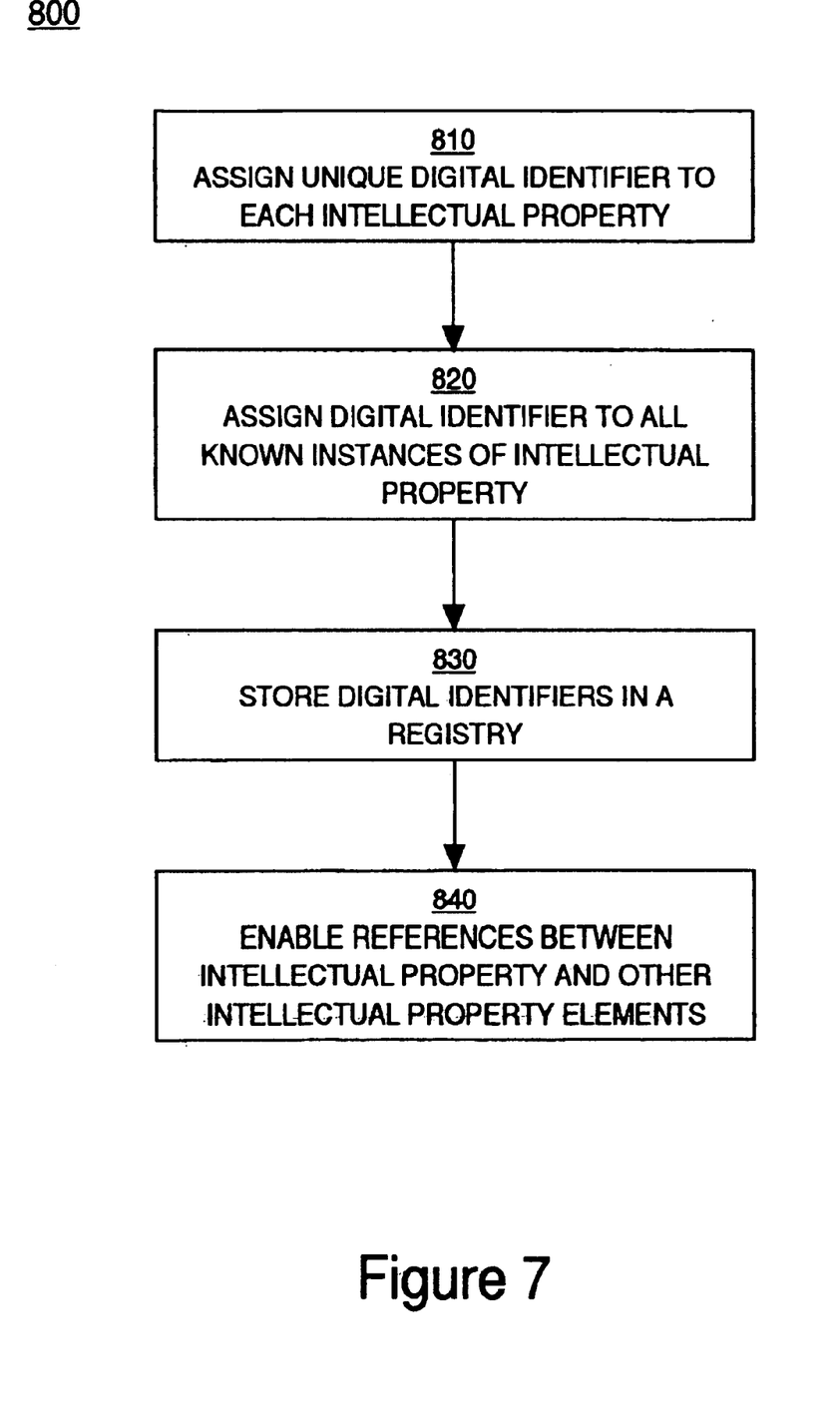
FIG. 7 is a flowchart of the steps in a process for controlling the distribution of intellectual property in accordance with one embodiment of the present invention.

FIG. 7 is a flowchart of the steps in a process 800 for controlling intellectual property in an intellectual property management system in accordance with one embodiment of the present invention. Process 800 can be implemented via computer-readable program instructions stored in a memory unit (e.g., random access memory 102, read-only memory 103, and/or data storage device 104) and executed by processor 101 of computer system 190 (FIG. 1A). In one embodiment, process 400 is implemented via a client-server computer system network (e.g., network 170 of FIG. 1B).

In step 810 of FIG. 7, a unique digital identifier (e.g., DID 205 of FIG. 2) is assigned to an intellectual property (e.g., intellectual property 202 of FIG. 2). DID 205 serves as a URI (e.g., a URN) pointing to intellectual property 202. In accordance with the present embodiment of the present invention, DID 205 includes a URI string that is substantially compliant with IETF RFC 2396, attribute(s) identifying the URN as belonging to the IP over IP framework, and attribute(s) specifying the origin or source of the URN. In addition, the URN can include attribute(s) identifying where the intellectual property falls within the system or organization that is the origin or source of the DID. In one embodiment, the digital identifier is embedded within the intellectual property, or it may be inscribed within a document or element which accompanies, proceeds, follows, or is otherwise related to the intellectual property.

In step 820 of FIG. 7, the URN is assigned to all registered or known instantiations of intellectual property 202. The instantiations are identified by their respective URLs; thus, for an intellectual property, its URN can be resolved to the URLs of all known or registered instantiations.

In step 830 of FIG. 7, the instantiations of an intellectual property are registered against its URN and stored, for example, in a system exemplified by system 700 of FIG. 6. Accordingly, all known or registered instantiations (URLs) can be looked up and found by accessing system 700.

In step 840 of FIG. 7, using the URCs for the intellectual property, electronic links, hyperlinks, or other types of references or pointers are enabled between intellectual property 202 and other intellectual property elements (e.g., DRF 210, DFF 220 and DLA 230 of FIG. 2) in order to model and regulate the use (or potential use) of the intellectual property. Known characteristics of the intellectual property resource or localized instantiations of the resource are thereby registered and related to the URN and URLs through the URCs. Characteristics of intellectual property resources can be looked for using, for example, system 700. In addition, in response to a user or system query, the characteristics can be used to identify a resource or an instantiation of a resource that satisfies requirements specified in the query.

In summary, in the present embodiment, the instantiations of an intellectual property resource can be assigned a URN, and URCs can be assigned to either the URN or to the instances of the intellectual property resource at their URLs. The present embodiment of the present invention thus provides a method and system thereof for controlling intellectual properties in an intellectual property management system. The present invention provides an infrastructure for uniquely naming an intellectual property, assigning this name to all known instantiations of the property, and for assigning information regarding the intellectual value as well as other characteristics to the intellectual property. Intellectual and other characteristics can also be assigned to the property to facilitate searching, tracking, classifying, understanding and manipulation of the intellectual property.

The preferred embodiment of the present invention, digital identifiers and digital identifier control systems for intellectual properties, is thus described. While the present invention has been described in particular embodiments, it should be appreciated that the present invention should not be construed as limited by such embodiments, but rather construed according to the following claims.

What is claimed is:

1. A method for controlling intellectual properties in an intellectual property management system, said method comprising:

assigning a unique digital identifier to an intellectual property, wherein said digital identifier comprises a Uniform Resource Identifier (URI) that points to an instantiation of said intellectual property, said digital identifier comprising an attribute associating said intellectual property to said intellectual property management system, wherein said digital identifier comprises multiple strings that provide information about said intellectual property and wherein further said digital identifier is parsable into XML (Extensible Markup Language) elements;

assigning said digital identifier to known instantiations of said intellectual property;

storing said digital identifier in a registry; and enabling executable links that link said digital identifier and other URIs that point to intellectual property elements that describe characteristics of said intellectual property, said intellectual property elements comprising at least one of a digital feature element that describes features of said intellectual property, a digital rights element that describes legal rights and limitations associated with said intellectual property and a digital license element that provides a license for said intellectual property, wherein an intellectual property element having an executable link to said intellectual property is automatically accessed in response to a request for said intellectual property by selection and execution of said executable link.

2. The method for controlling intellectual properties in an intellectual property management system as recited in claim 1 further comprising:
   specifying information associated with characteristics of an intellectual property that is being looked for; and
   performing a search to identify which of said intellectual properties satisfy said characteristics.

3. The method for controlling intellectual properties in an intellectual property management system as recited in claim 1 further comprising:
   parsing said digital identifier to transform said digital identifier into and out of XML (Extensible Markup Language) elements.

4. The method for controlling intellectual properties in an intellectual property management system as recited in claim 1 further comprising:
   determining said characteristics of said intellectual property by reading a portion of said digital identifier.

5. A computer system comprising:
   a bus;
   a processor coupled to said bus; and
   a memory unit coupled to said bus, said memory unit containing instructions that when executed implement a computer-implemented method for controlling intellectual properties in an intellectual property management system, said method comprising:
   assigning a unique digital identifier to an intellectual property, wherein said digital identifier comprises a Uniform Resource Identifier (URI) that points to an instantiation of said intellectual property, said digital identifier comprising an attribute associating said intellectual property to said intellectual property management system, wherein said digital identifier comprises multiple strings that provide information about said intellectual property and wherein further said digital identifier is parsable into XML (Extensible Markup Language) elements;
   assigning said digital identifier to known instantiations of said intellectual property;
   storing said digital identifier in a registry; and
   enabling executable links that link between said digital identifier and other URIs that point to intellectual property elements that describe characteristics of said intellectual property, said intellectual property elements comprising at least one of a digital feature element that describes features of said intellectual property, a digital rights element that describes legal rights and limitations associated with said intellectual property and a digital license element that provides a license for said intellectual property, wherein an intellectual property element having an executable link to said intellectual property is automatically accessed in response to a request for said intellectual property by selection and execution of said executable link.

6. The computer system of claim 5 wherein said processor performs said method for controlling intellectual properties in an intellectual property management system further comprising:
   specifying information associated with characteristics of an intellectual property that is being looked for; and
   performing a search to identify which of said intellectual properties satisfy said characteristics.

7. The computer system of claim 5 wherein said processor performs said method for controlling intellectual properties in an intellectual property management system further comprising:
   parsing said digital identifier to transform said digital identifier into and out of XML (Extensible Markup Language) elements.

8. The computer system of claim 5 wherein said processor performs said method for controlling intellectual properties in an intellectual property management system further comprising:
   determining said characteristics of said intellectual property by reading a portion of said digital identifier.

9. A computer-usable medium having computer-readable program code embodied therein for causing a computer system to perform a method for controlling intellectual properties in an intellectual property management system, said method comprising:
   assigning a unique digital identifier to an intellectual property, wherein said digital identifier comprises a Uniform Resource Identifier (URI) that points to an instantiation of said intellectual property, said digital identifier comprising an attribute associating said intellectual property to said intellectual property management system, wherein said digital identifier comprises multiple strings that provide information about said intellectual property and wherein further said digital identifier is parsable into XML (Extensible Markup Language) elements;
   assigning said digital identifier to known instantiations of said intellectual property;
   storing said digital identifier in a registry; and
   enabling executable links that link said digital identifier and other URIs that point to intellectual property elements that describe characteristics of said intellectual property, said intellectual property elements comprising at least one of a digital feature element that describes features of said intellectual property, a digital rights element that describes legal rights and limitations associated with said intellectual property and a digital license element that provides a license for said intellectual property, wherein an intellectual property element having an executable link to said intellectual property is automatically accessed in response to a request for said intellectual property by selection and execution of said executable link.

10. The computer-usable medium of claim 9 wherein said computer-readable program code embodied therein causes a computer system to perform said method comprising:
    specifying information associated with characteristics of an intellectual property that is being looked for; and
    performing a search to identify which of said intellectual properties satisfy said characteristics.

11. The computer-usable medium of claim 9 wherein said computer-readable program code embodied therein causes a computer system to perform said method comprising:
    parsing said digital identifier to transform said digital identifier into and out of XML (Extensible Markup Language) elements.

12. The computer-usable medium of claim 9 wherein said computer-readable program code embodied therein causes a computer system to perform said method comprising:
    determining said characteristics of said intellectual property by reading a portion of said digital identifier.

* * * * *